2 Sheets—Sheet 1.

R. BRYSON.

Harvester Rake.

No. 2,620. Reissued May 21, 1867.

WITNESSES:

R. L. Campbell

Edw Schofer

INVENTOR

R Bryson by Mason Fenwick & Lawrence

N. PETERS, Photo-Lithographer, Washington, D. C.

2 Sheets—Sheet 2.
R. BRYSON.
Harvester Rake.
No. 2,620.
Reissued May 21, 1867.
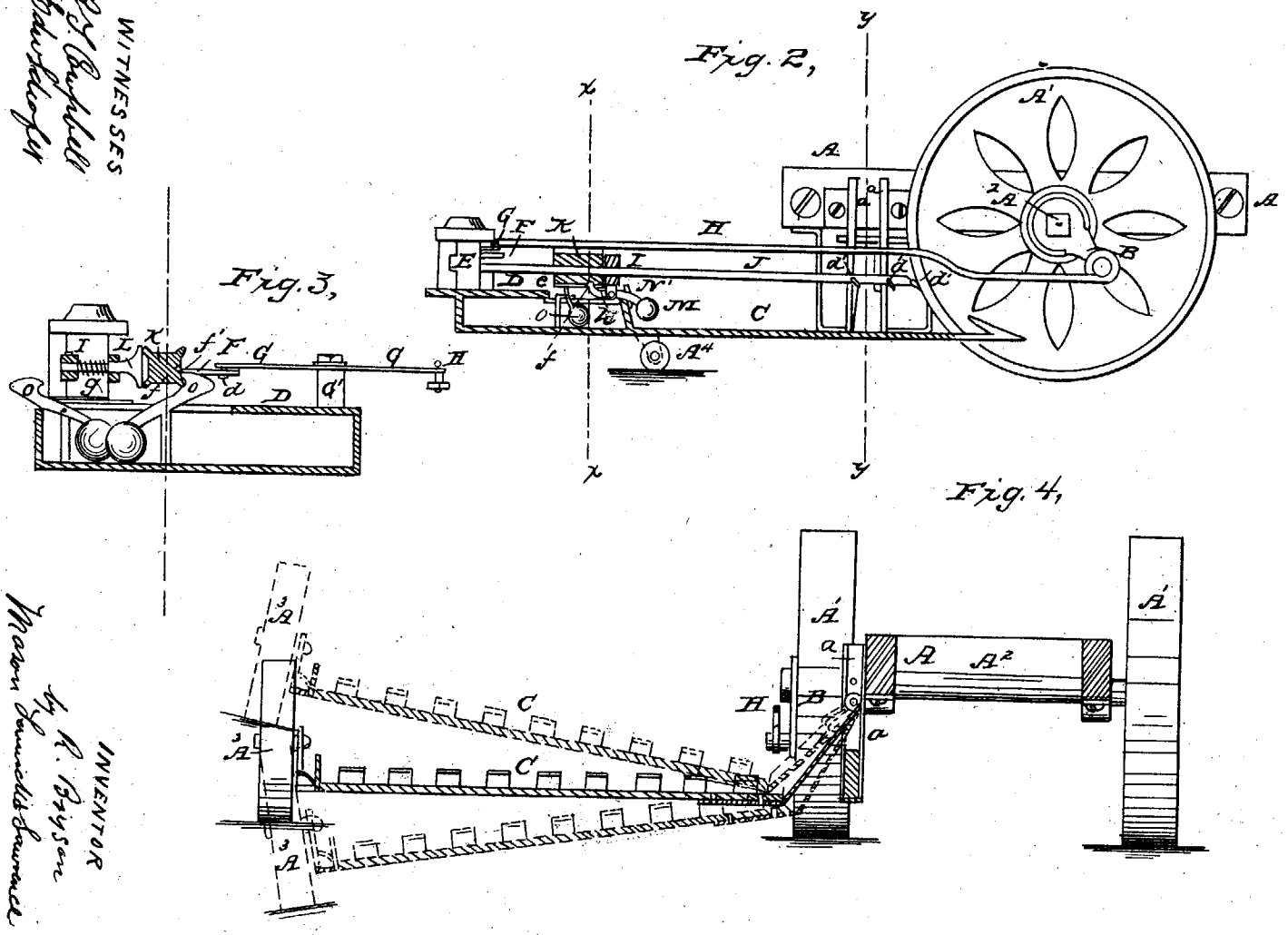
WITNESSES
R. J. Campbell
Edw. Schofer
INVENTOR
R. Bryson
by Mason Fenwick & Lawrence
N. PETERS, Photo-Lithographer, Washington, D. C.

United States Patent Office.

ROBERT BRYSON, OF SCHENECTADY, NEW YORK.

*Letters Patent No.* 34,875, *dated April* 8, 1862; *reissue No.* 2,620, *dated May* 21, 1867.

IMPROVEMENT IN HARVESTER-RAKES.

The Schedule referred to in these Letters Patent and making part of the same.

TO ALL WHOM IT MAY CONCERN:

Be it known that I, ROBERT BRYSON, of Schenectady, in the county of Schenectady, and State of New York, have invented certain new and useful improvements in Harvesting Machines; and I do hereby declare that the following is a full, clear, and exact description of that part of said invention which relates to division No. 2, reference being had to the accompanying drawings, making a part of this specification, in which—

Figure 2 is a longitudinal section, taken in a vertical plane through the platform and raking devices looking toward the draught-frame.

Figure 3 is a transverse section, taken in the vertical plane indicated by red line *x x* in fig. 2, looking toward the rear of the platform.

Figure 4 is a transverse section, taken in the vertical plane indicated by red line *y y* in fig. 2, showing the finger-beam in three different positions as it would vibrate about its axis of motion.

Similar letters of reference indicate corresponding parts in the several figures.

Figure 1:
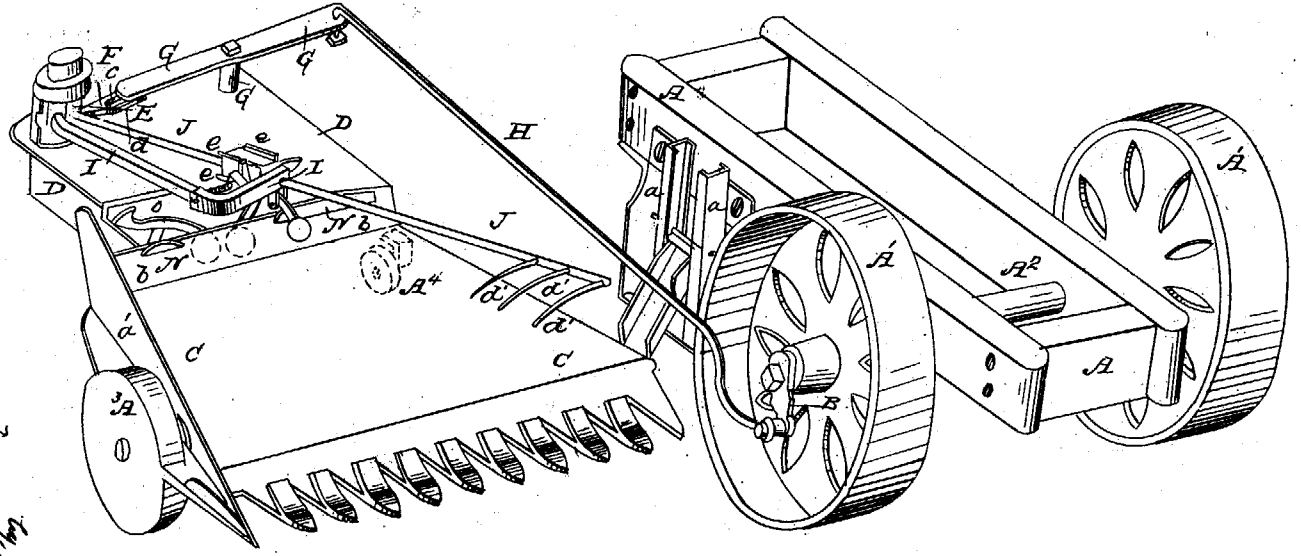
Figure 1 is a perspective view of the improved machine.

This invention relates to a new and improved rake, which is mounted upon a platform and caused to sweep the grain from the inner side of the platform and deliver it in gavels upon the ground in rear of the main frame. Said rake is so constructed that its teeth will be automatically thrown down in raking position, and held firmly in such position during the raking strokes, and then thrown up out of the way of the grain upon the platform, and held firmly in this position during the return strokes. It is also so constructed that its point of support can be located in rear of the grain-platform, and successfully operated from the main axle of the transporting wheels of the draught-frame, as will be hereinafter described.

To enable others skilled in the art to understand my invention, I will describe its construction and operation.

In the accompanying drawings, A represents the main or draught-frame, which is adapted for having applied to it a driver's seat and a draught-tongue. This frame A is mounted upon two transporting wheels $A^1$ $A^1$, which are also driving-wheels for operating a rake and a cutting apparatus. These wheels are applied loosely upon a transverse axle, $A^2$, and connected thereto by means of pawls and ratchets, so that when the machine is moved forward said axle will turn with the wheels, and when the machine is moved backward the wheels will turn freely around the axle. By having a ratchet and pawl applied to each wheel, as described, the axle will be turned by one or the other of the wheels when the machine is turned around. On that end of the axle $A^2$ which projects from the grain side of the frame A, a crank or eccentric, B, is keyed for the purpose of communicating motion to the rake mechanism, as will be hereinafter described. C represents the platform upon which the grain falls as it is cut, which platform is hung in rear of the driving-wheels $A^1$, and attached by means of a suitable joint to the grain side of the main frame. The mode of attachment, shown in the drawings, consists of two upright guides, *a a*, which are secured firmly to the frame A parallel to each other, within which guides are sliding or rolling boxes, and to these boxes the inner end of the finger-beam, or a bracket projecting from the platform C, is suitably hinged, as clearly shown in fig. 4. This mode of attaching the finger-beam and platform to the main frame affords a free joint which will allow the outer end of said finger-beam and platform to vibrate above and below a horizontal position, and thus conform to the undulations of the ground, as indicated by the red and blue lines in fig. 4. Said attachment will also allow the finger-beam and platform to rise and descend bodily. The outer part of the finger-beam, together with the platform which is secured to it, is sustained by a small wheel, $A^3$, shown in figs. 1 and 4, and in rear of the cutting apparatus, on that side of the platform which is nearest the main frame A, another supporting wheel, $A^4$, is applied for sustaining the rear part of the platform, as shown in figs. 1, 2, and 4. The platform C is broader at its front edge than it is at its rear end, and it is guarded on its outer or grain side by an inclined dividing and directing board, *a'*, and at its rear end by a slightly twisted board, *b*, which rises from the surface of the platform a proper distance. To this rear board *b* an extension or auxiliary platform, D, is attached and closed in at all sides, and at top to a considerable extent. The form of the platform C and its extension D may be different from that shown without departing from the invention which I claim. E represents a rock-shaft, which is perpendicular, or nearly so, to the platform D, upon which said shaft is arranged as shown in the drawings. From one side of this shaft extends a horizontal slotted arm, F, in the slot *e*, of which the vertical pin *d* of a horizontal vibrating lever, G, plays freely. The lever G is pivoted to a post, G′, located near the rear inner end of platform D, and connected to the crank B of the axle $A^2$ by a pitman-rod, H. From an opposite side of the rock-shaft E a right-angled bar or rake-guide, I, projects, and extends to the rear guard-board *b*; and from the front side of said shaft E a rake-head, J, extends, and passes through the front bent arm of the bar I. This rake-head J terminates just at the back of the cutting apparatus, and has rake-teeth *d′* firmly secured to it near said termination, the rake-teeth standing at right angles to their head, and being slightly curved so as to hug the grain during the raking strokes. The rake-head being thus arranged so as to turn in the path of a vertical circle a quarter of a revolution, will also vibrate in a plane parallel, or nearly so, to the platform C. In order to allow the rake-teeth to move closely up to the guard *a′*, and then turn down into raking position, slots may be cut through this guard. K represents a four-sided block, which is secured fast on the rake-head J, and which is located in rear of the front angle of the guide I, and has rounded projecting corners *e e e e* and recesses *f f′* formed on and in it. The cavities or recesses are in the centre of the width of the block and near one end, and run at right angles to each other, as shown. L is a hammer-shaped spring-stop for bearing equally against one or the other of two sides of the block according as the block changes its position. This stop L fits in guides of the bar I, and is arranged to slide back and forth from one side to the other of the platform D. The stop fits in guides of the bar I, and is arranged so as to spring back and allow the block K, with its rake-bar, to be oscillated at proper times. The spring which acts upon this stop to hold it against the block will prevent the rake from being turned too far around. M is a loaded lever, or a spring-lever, which is hung to the under side of the angular guide-bar I, so as to cross the rear guard-board *b*. N N′ are opposing inclined lugs attached to the top edge of the board *b*. These inclined lugs are set some distance apart, and are designed to elevate the loaded arm of the lever M, and thus lower the hook or bent end *h* thereof. The hooked end of the lever M takes into the cavity *f* when the rake is sweeping the grain off of the platform, and into the cavity *f′* when it is moving back with its teeth horizontal and clear of the platform, the inclined lug N throwing it out of the cavity *f*, and the inclined lug N′ out of the cavity *f′*, and its loaded arm insuring its re-entrance into said cavities at the proper time, or when the inclined planes cease to act upon the loaded end of the lever. O O are two loaded tripping-hook levers. They are pivoted to the sides of vertical standards of the auxiliary platform D. These levers vibrate vertically, and the hooks on their upper ends are set so as to operate in opposition to one another. Between the hooks of the levers O O the square block K of the rake-head moves, and in its movements back and forth the corners *e e* of the block strike one or the other of the hooks accordingly as the rake-head is moving, and by reason of this contact and the weights on the ends of the levers O O the square block K is turned the distance of a quarter of a circle in its movement toward the open or discharge side of the platform, and a like distance in its return movement. Before these movements of the block K can be effected, the lever-hook stop M is forced by the inclined lugs N N′ out of the cavities *f f′*. The extent and rapidity of the movements of the block are controlled by means of the spring-stop L; said stop also serves to maintain the block in its proper position by bearing on the corners thereof, which corners, by being rounded and projected, as shown, reduce the frictional contact while the changes in the position of the block K and rake are being effected.

From the foregoing description it will be seen that the crank B in its revolution vibrates the lever G through the rod H; that the lever G in its vibrations rocks the shaft E through the slotted arm F; and that the rake is, through shaft E, caused to traverse the platform C, in the path of a horizontal plane, both back and forth; the rake, in its forward movement, sweeping the grain from the platform to a position in rear of the draught-frame; and finally, that the rake, at the completion of its forward stroke, is tripped and thrown up clear of the platform by the combined aid of the inclined planes and the lever-hooks O O, and maintained in this position by the hammer-shaped lever and the lever-hook M while it is making its back movement, and at the completion of said movement is again tripped, and its teeth thrown down to a raking position for sweeping off another gavel from the platform, and maintained in this position by the hammer-shaped lever and the hooked lever. The rake-arm J receives an intermittent oscillating movement about its own axis for bringing the teeth into raking position at the outer end of the platform, and then turning these teeth up out of such position at the inner end of the platform. At the same time the rake-arm receives a vibrating movement in a plane parallel to the platform by the oscillation of the upright shaft E, which is located near the rear end of the platform D, as before explained. I prefer to locate the rake-shaft or support E at or near the rear end of the platform instead of at one side thereof, for the purpose of having a shorter platform, and allowing the inner driving-wheel to run close to the standing grain. By such arrangement of the rake-support the grain will fall in front of it and will not be liable to tangle with the raking devices.

Having described that part of my invention which relates to division No. 2, what I claim as new, under this division, and desire to secure by Letters Patent, is—

1. The combination of the vertical shaft E, angular guide-bar I, rake-head J, slotted arm F, connecting-rod H, vibrating lever G, and crank B, substantially in the manner and for the purpose described.

2. The combination of the many-sided block K, rake-head J, spring-stop L, inclined lugs N N′, loaded lever-hook M, and loaded tripping-hook levers O O, the whole being constructed to operate substantially as described.

3. In combination with a platform hinged to a draught-frame having two supporting and driving-wheels, I claim a circularly sweeping rake-arm or handle, which moves in a plane parallel to the plane of the hinged platform on a pivot which is on said platform, and which also receives an intermittent oscillating motion about its own axis when the support of such rake-arm is located at or near the rear end of the platform, which is attached directly to the finger-beam, substantially as and for the purpose described.

4. A hinged platform, with a vibrating rake mounted upon it, said rake moving in the plane of the top of the platform while sweeping off the grain, and then oscillating on its own axis so as to move back above the grain, which is to be swept off by it in its return forward stroke, substantially as herein described.

5. A rake-arm which sweeps in the path of a part of a horizontal circle, oscillates in the path of a vertical circle, all without changing its altitude at any point, such rake-arm being mounted on a platform which is hinged to the draught-frame, and which is directly behind the cutting apparatus, substantiantially as described.

6. A hinged platform with the elevated extension D adapted for sustaining a rake which delivers the cut grain in gavels upon the ground in rear of the draught-frame, substantially as described.

7. A hinged platform with a rake-arm, J, which is provided with a latching device, said latching device moving with the rake-arm in its passage over the platform, and acting to hold the teeth of the rake-arm in a position for raking, and also in a position for passing unobstructedly over the grain upon the hinged platform, substantially as described.

8. A rake which has both a circular vibrating movement and an intermittent oscillating movement, all without changing the plane of the rake-arm, mounted on a platform which is hinged to a two-wheeled draught-frame, substantially as and for the purpose described.

9. A rake which has both a circular vibrating movement and an intermittent oscillating movement about its own axis, all without changing the plane of the rake-arm, such rake being mounted on a hinged platform and driven by a crank and pitman from the inner side of a draught-frame, which has two separate and independent driving and supporting wheels, substantially as described.

ROBT. BRYSON.

Witnesses:
JNO. DE LANCEY WATKINS,
JAMES HANLEY.